United States Patent
Pepin et al.

(10) Patent No.: US 6,776,698 B2
(45) Date of Patent: Aug. 17, 2004

(54) WHEEL CLEANING DEVICE

(76) Inventors: Daniel Pepin, 144, 6$^e$ Avenue, Saint-Constant, QBC (CA), J5A 1W5; Pierre Jutras, 231 David, Saint-Constant, QBC (CA), J5A 1Y7

( * ) Notice: Subject to any disclaimer, the term of this patent is extended or adjusted under 35 U.S.C. 154(b) by 79 days.

(21) Appl. No.: 09/934,852

(22) Filed: Aug. 23, 2001

(65) Prior Publication Data

US 2003/0040266 A1 Feb. 27, 2003

(51) Int. Cl.$^7$ .............................................. B24B 27/04
(52) U.S. Cl. ...................... 451/434; 15/256.5; 15/160; 15/246; 280/855
(58) Field of Search ................................ 451/428, 434, 451/424, 439, 415; 15/256.5, 246, 160; 280/855

(56) References Cited

U.S. PATENT DOCUMENTS

| | | | |
|---|---|---|---|
| 2,960,337 A | * 11/1960 | Johnson ..................... | 15/256.5 |
| 3,988,071 A | 10/1976 | Cochran et al. | |
| 4,045,836 A | 9/1977 | Glenn | |
| 4,551,952 A | * 11/1985 | West .......................... | 451/439 |
| 5,056,274 A | 10/1991 | Stern | |
| 5,553,932 A | 9/1996 | Freeman | |
| 5,566,420 A | * 10/1996 | Specht ....................... | 15/256.5 |
| 5,964,002 A | 10/1999 | Schaal | |
| 6,183,345 B1 | 2/2001 | Kamono et al. | |

FOREIGN PATENT DOCUMENTS

| | | | | |
|---|---|---|---|---|
| DE | 136070 | * | 1/1902 | ................... 15/160 |
| DE | 3819991 | * | 1/1989 | ................ 15/256.5 |
| JP | 10-217917 | * | 8/1998 | ................ 15/256.5 |

* cited by examiner

*Primary Examiner*—Robert A. Rose

(57) ABSTRACT

A wheel cleaning device for cleaning and/or polishing a rim or any other exposed part of the wheel during traveling of the vehicle. The device includes a mounting support for securing the device to the wheel axle so as to be in a stationary relationship relative to the wheel and a cleaner having a shaft and a brush. The shaft has a first end rotatably connected to the support for continuous rotation relative thereto about the rotation axis of the wheel and a second end extending radially from the first end. The brush mounting on the second end of the shaft is positioned, configured and sized to contact the wheel. The brush depends downwardly from the support under gravity to continuously rub against the wheel to clean the wheel under rotation during traveling of the vehicle.

12 Claims, 3 Drawing Sheets

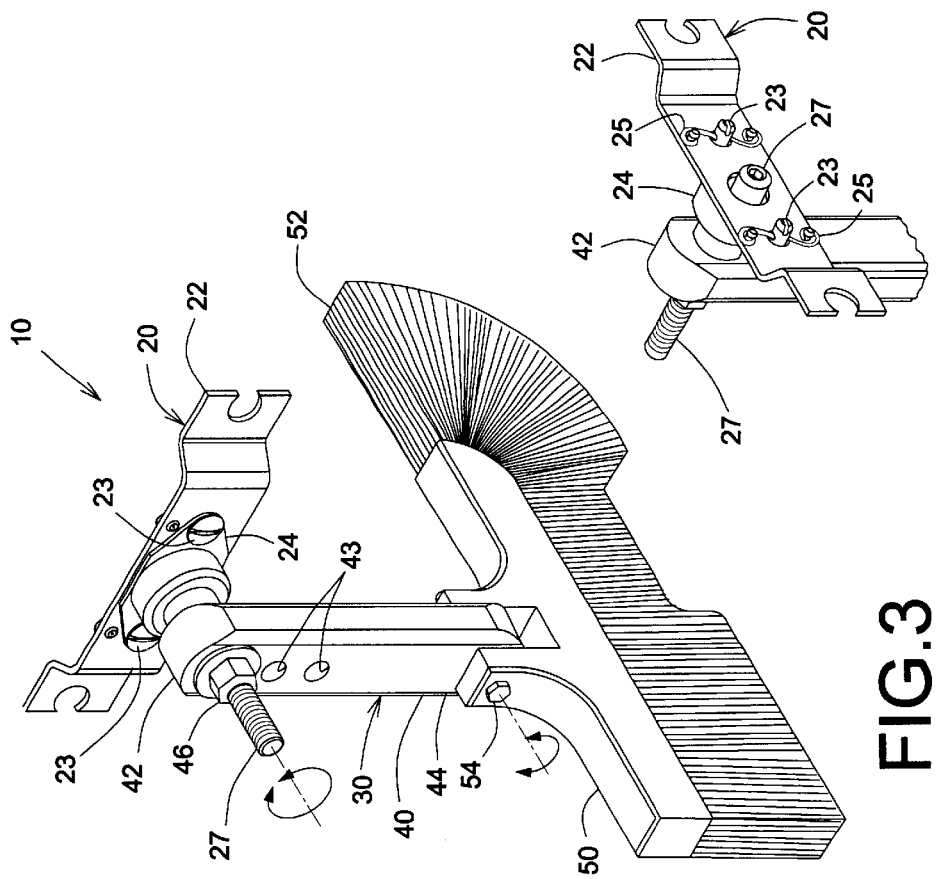
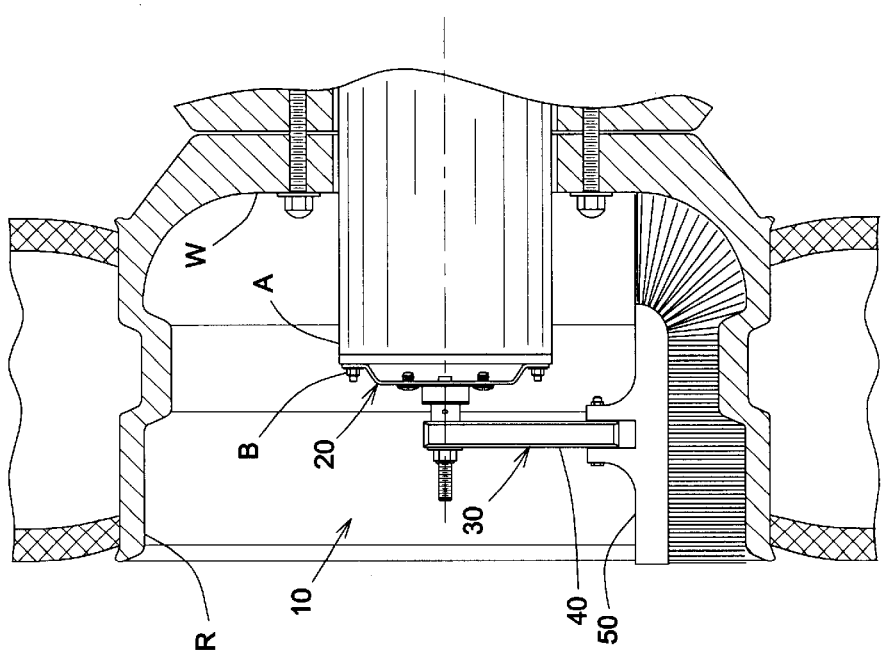

WHEEL CLEANING DEVICE

FIELD OF THE INVENTION

The present invention relates to cleaning devices and more particularly to a cleaning device for cleaning and/or polishing rims of vehicle wheels while the vehicle is traveling.

BACKGROUND OF THE INVENTION

Traditionally a wheel cleaning or washing device has always been present in automobile and/or truck washing facilities such as automatic motor vehicle laundries, where each entire wheel of a vehicle is washed and cleaned during one pass of the forwardly moving, rotating wheel in front thereof.

U.S. Pat. No. 3,643,272 granted on Jun. 2, 1972 to Rickel discloses brush assemblies that provide surface cleaning of the automobile wheel in a linear travel distance inside of the automobile laundries. These devices need a special equipment location that can provide a source of electrical energy to drive the washing power unit, plus a source of washing fluid, which also may be connected to the power unit. It is a high cost cleaning procedure process and very often different portions of the wheel are not reached by the cleaning device during washing operation.

U.S. Pat. No. 5,056,274 granted on Oct. 15, 1991 to Stern discloses a device which permits a wet blasting for cleaning vehicle wheels in cases when only liquid is not capable of effecting the cleaning procedure. The limitation of the prior art is an even more costly device which needs special power units.

Other wheel cleaners require the wheels to be taken off from the vehicle and installed in the cleaner one at a time, which is time consuming and require skilled operators.

OBJECTS OF THE INVENTION

It is therefore a general object of the present invention to provide a cleaning device for vehicle wheels that obviates the above-mentioned disadvantages.

Another object of the present invention is to provide a wheel cleaning device functioning without any external power source for effective wheel cleaning during a vehicle traveling by taking advantage of the natural gravity.

A further object of the present invention is to provide a wheel cleaning device which uses natural blasting recourses due to a vehicle traveling.

Still another object of the present invention is to provide a wheel cleaning device that is simple, adaptable, and easy to build.

Still a further object of the present invention is to provide a wheel cleaning device that allows for considerable time savings for cleaning wheels.

Yet another object of the present invention is to provide a wheel cleaning device that is efficient and requires a relatively low power for cleaning procedure.

Other objects and advantages of the present invention will become apparent from a careful reading of the detailed description provided herein, with appropriate reference to the accompanying drawings.

SUMMARY OF THE INVENTION

According to the present invention, there is provided a wheel cleaning device for cleaning a wheel of a vehicle during traveling thereof, the wheel mounting on a wheel axle and defining a rotation axis thereof, said device comprises: a mounting support for securing to the wheel axle so as to be in a stationary relationship relative to the wheel; a cleaner having a shaft and a brush, said shaft having a first end rotatably connecting to said mounting support for continuous free rotation relative thereto about the wheel axis and a second end extending generally radially from said first end, said brush mounting on said second end of said shaft, said brush being positioned, configured and sized for contacting the wheel, wherein said brush depends downwardly from said mounting support so as to continuously rub against the wheel to clean the wheel under rotation during traveling of the vehicle.

In one embodiment, the support includes a first part for securing to the wheel axle, a second part rotatably supporting said shaft and releasably mounting on said first part.

Typically, the second part includes a bearing rotatably supporting said first end of said shaft.

In one embodiment, the first end of said shaft is axially adjustable relative to said support.

In one embodiment, the first end of said shaft is radially adjustable relative to said support.

In one embodiment, the brush is substantially axially, pivotally mounted on said second end of said shaft.

Typically, the first end of said shaft is axially adjustable relative to said second part of said support.

Alternatively, the first end of said shaft is radially adjustable relative to said support.

Typically, the brush has bristles on an external perimeter substantially assuming an exposed surface of a radial section of the wheel so as to rub against and clean the exposed surface of the wheel under rotation during traveling of the vehicle.

Typically, the bristles are configured and sized for allowing partial bending thereof when in contact with the exposed surface of the wheel so as to ensure a pressure contact therebetween.

In one embodiment, the brush is substantially radially, pivotally mounted on said second end of said shaft.

BRIEF DESCRIPTION OF THE DRAWINGS

In the annexed drawings, like reference characters indicate like elements throughout.

FIG. 2 is a sectional view taken along line 2—2 of FIG. 1, showing a first embodiment used for rear wheels of a truck vehicle;

FIG. 3 is an enlarged front perspective view of the embodiment of FIG. 2;

FIG. 3a is a partial enlarged rear perspective of the embodiment of FIG. 3;

DETAILED DESCRIPTION OF THE PREFERRED EMBODIMENTS

With reference to the annexed drawings the preferred embodiments of the present invention will be herein described for indicative purposes and by no means as of limitation.

Figure 1:
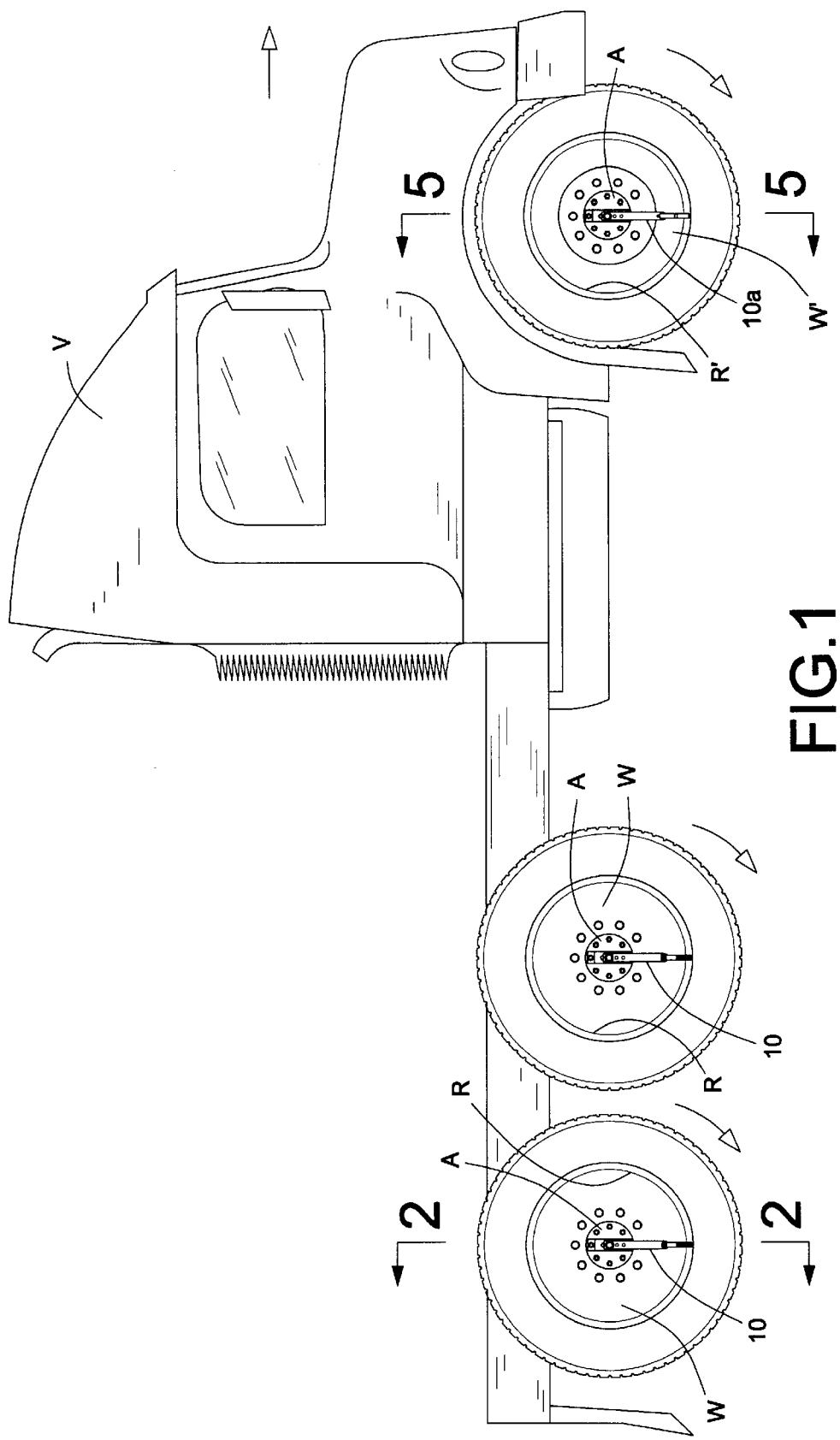
FIG. 1 is a side elevation view of two embodiments of a wheel cleaning device according to the present invention installed in a working configuration.

FIG. 1 illustrates embodiments 10, 10a of a wheel cleaning device in accordance with the present invention. The first 10 and second 10a devices are mounted on a vehicle V (truck, trailer, automobile, etc.) for cleaning the rear W and front W' wheels respectively during traveling of the vehicle V. The devices 10, 10a illustrated herein are shown to clean and more specifically to polish the rim R and/or the body of the corresponding wheels W, W', but could be simply adapted to clean any part of the wheel W.

Figure 4:
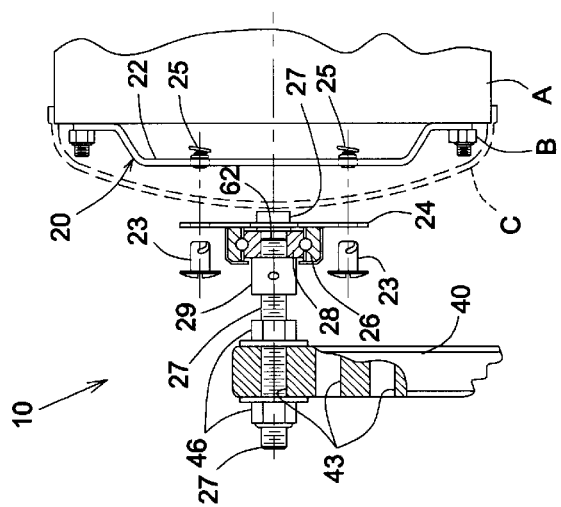
FIG. 4 is a partial exploded side view of the support of the embodiment of FIG. 2.

Referring to FIGS. 2 to 4, the device 10 comprises a mounting support 20 and a cleaner 30. The support 20 is preferably fastened to an axle A of the vehicle V via the existing bolts B. The cleaner 30 includes a shaft 40 and a brush 50. The shaft 40 has a first end 42 of the shaft 40 that is freely rotatably connected to the support 20 about the axis of the axle A of the wheel W, and a second end 44 that extends radially from the first end 42. The brush 50 is secured to the second end 44 as to have its bristles 52 touching the rim R of the wheel W to rub against that rim R and clean it during traveling of the vehicle V. The cleaner 30 is heavy enough for keeping the brush 50 hanging down with possible partial oscillation around the first end 42 of the shaft 40 while providing resistance to the pushing airflow due to the speed of the vehicle V during traveling. The bristles 52 preferably have an external contour that assumes an exposed radial section of the rim R of the wheel W, such that they 52 rub against and clean an exposed annular surface of the rim R corresponding to that section during traveling of the vehicle V.

As illustrated in FIGS. 3, 3a and 4, the support 20 preferably includes a first part 22 secured to the axle A of the wheel W to remain permanently secured thereto, and a second part 24 releasably mounted on the first part 22 and pivotally supporting the first end 42 of the shaft 40. The second part 24 is releasably connected to the first part 22 using a pair of quarter-turn type fasteners such as helically transversely slotted screws 23 releasably engaging complementary transverse springs 25 fixed to the first part 22.

The second part 24 (see FIG. 4) has a ball bearing 26 with a mounting screw 27 axially clamping its inner race 28 using a set screw 29 to allow for the screw 27 to freely rotate relative to the first part 22 of the support 20 about the axis of the axle A.

The first end 42 of the shaft 40 includes at least one bore 43 to engage the screw 27. The shaft 40 is axially adjustably secured to the screw 27 using nuts 46, thus allowing for proper axial positioning of the brush 50 relative to the rim R of the wheel W and ensure contact therewith.

Furthermore, the radial position of the brush 50 relative to the axis of the axle A can be adjusted either by selecting one of the parallel bores 43 spaced apart along the shaft 40, as shown in FIGS. 3 and 4, or by positioning the screw 27 along a radially extending slot hole (not shown) of the shaft 40.

Alternatively, as is illustrated in FIG. 3, the brush 50 is freely pivotally secured to the second end 44 of the shaft 40 using screw 54 about an axis substantially parallel to the axis of the axle A, and/or the bristles 52 are relatively long to bend when in contact with the rim R so as to ensure a pressure contact there between and for the device 10 to adapt to a wide variety of wheel sizes.

As shown in FIGS. 3, 3a and 4, the longitudinal extremities of the first part 22 of the support 20 could be partially chopped off to allow for the removable cap C (shown in dashed lines in FIG. 4) covering the bolts B of the axle A to fit back on the axle A with the first part 22 remaining secured thereon, after cleaning and/or polishing of the rim R. The other components of the device 10 being easily removed, and put back on axle A whenever required, using the quarter-turn screws 23.

Figure 6:
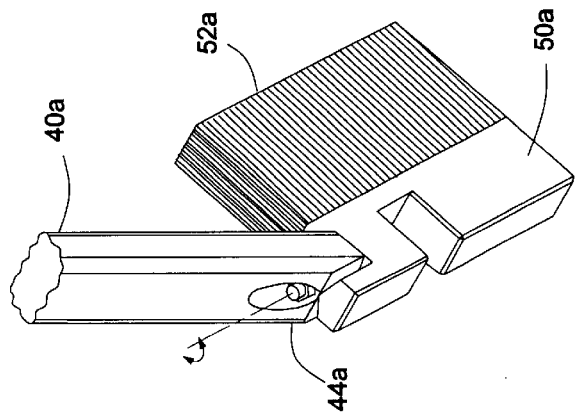
FIG. 6 is a partial perspective view of the brush of the embodiment of FIG. 5.
Figure 5:
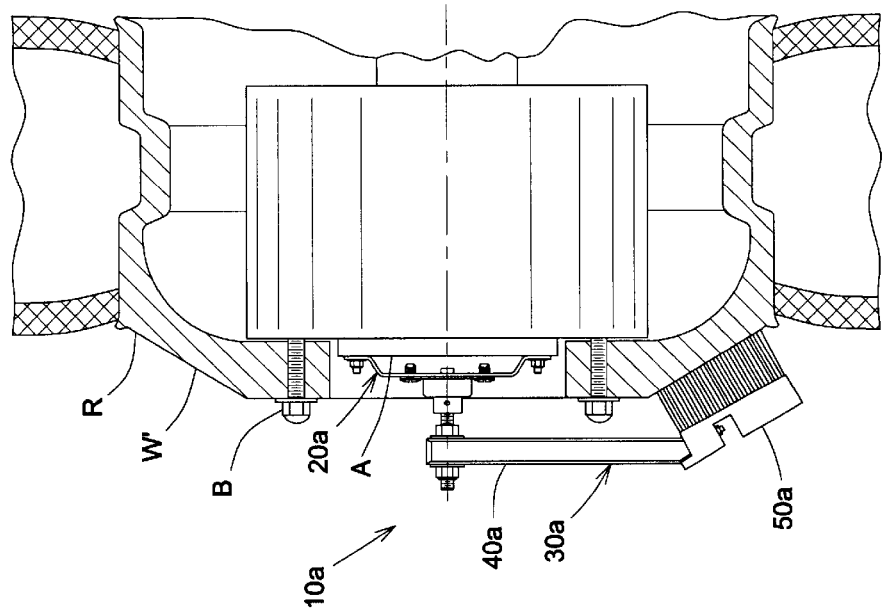
FIG. 5 is a sectional view taken along line 5—5 of FIG. 1, showing a second embodiment used for front wheels of a truck vehicle.

FIGS. 5 and 6 simply show a second device 10a including a similar support 20a mounted on the axle A and freely rotatably supporting the shaft 40a and the brush 50a of the cleaner 30a. The brush 50a has a different shape to adapt to the shape of the rim R' or body of the front wheels W' of the vehicle V and is substantially radially, partially freely pivotally mounted on the second end 44a of the shaft 40a to be able to partially pivot relative to the shaft 40a, as illustrated in FIG. 6, and allow for the bristles 52a to touch the rim R with a slight angle.

For using the device 10, the vehicle conductor needs to spend only a few minutes to remove the cap C (if there is one) of the wheel W and fasten the support 20 to the axle A by preferably using two of the bolts B.

If the conductor prefers, each wheel W may have a respective first part 22 of the support 20 permanently assembled on its respective axle A, and simply successively use the same cleaner 30 mounted on the second part 24 on the different wheels W.

When the device 10 is assembled on the axle A, polishing paste (not shown) may be applied on the bristles 52 and the vehicle V may start moving. The wheels W and the first part 22 of the support 20 then start to rotate relative to the shaft 40 and the brush 50 that keep hanging down under the gravity. The friction due to the relative motion between the bristles 52 and the rim R automatically creates the cleaning and/or polishing operation of the rim R.

After a few minutes of traveling, the cleaning and/or polishing is completed, the cleaner 30 is disassembled from the first part 22 of the support 20, and the cap C replaced on the axle A (if required). Also the device 10 can be completely disassembled from the axle A.

Obviously, the device of the present invention could also be used to clean the tire itself or any other part of the wheel W.

Although the present wheel cleaning device for cleaning a rim of the wheel during a vehicle traveling has been described with a certain degree of particularity it is to be understood that the disclosure has been may of example only and that present invention is not limited to the features of the embodiments described and illustrated herein, but includes all variations and modifications within the scope of the present invention as hereinafter claimed.

We claim:

1. A wheel cleaning device for cleaning a wheel of a vehicle during traveling thereof, the wheel mounting on a wheel axle and defining a rotation axis thereof, said device comprising:

a mounting support for securing to the wheel axle so as to be in a stationary relationship relative to the wheel;

a cleaner having a shaft and a brush, said shaft having a first end rotatably connecting to said mounting support for continuous free rotation relative thereto about the wheel axis and a second end extending generally radially from said first end, said brush mounting on said second end of said shafts said brush being positioned, configured and sized for contacting the wheel, wherein said brush depends downwardly from said mounting support so as to continuously rub against the wheel to clean the wheel under rotation during traveling of the vehicle.

2. The device of claim 1, wherein said support includes a first part for securing to the wheel axle, a second part rotatably supporting said shaft and releasably mounting on said first part.

3. The device of claim 2, wherein said second part includes a bearing rotatably supporting said first end of said shaft.

4. The device of claim 1, wherein said first end of said shaft is axially adjustable relative to said support.

5. The device of claim 1, wherein said first end of said shaft is radially adjustable relative to said support.

6. The device of claim 1, wherein said brush is substantially axially, pivotally mounted on said second end of said shaft.

7. The device of claim 3, wherein said first end of said shaft is axially adjustable relative to said second part of said support.

8. The device of claim 7, wherein said first end of said shaft is radially adjustable relative to said support.

9. The device of claim 8, wherein said brush is substantially axially, pivotally mounted on said second end of said shaft.

10. The device of claim 9, wherein said brush has bristles on an external perimeter substantially assuming an exposed surface of a radial section of the wheel so as to rub against and clean the exposed surface of the wheel under rotation during traveling of the vehicle.

11. The device of claim 10, wherein said bristles are configured and sized for allowing partial bending thereof when in contact with the exposed surface of the wheel so as to ensure a pressure contact therebetween.

12. The device of claim 1, wherein said brush is substantially radially, pivotally mounted on said second end of said shaft.

* * * * *